ary Examiner—Donald O. Woodiel
United States Patent
Braden et al.

[15] 3,656,343
[45] Apr. 18, 1972

[54] APPARATUS FOR PROCESSING CURED TIRES

[72] Inventors: William D. Braden, Stow; Richard P. Marshall, Tallmadge; Richard J. Greenhorn, Stow; Arnold S. Buser, Akron, all of Ohio

[73] Assignee: The Goodyear Tire & Rubber Company, Akron, Ohio

[22] Filed: Feb. 2, 1970

[21] Appl. No.: 7,489

[52] U.S. Cl. ................................................73/146, 198/19
[51] Int. Cl. .......................................................G01m 17/02
[58] Field of Search ..............................73/146, 483; 198/19

[56] References Cited

UNITED STATES PATENTS 3,500,681   3/1970   Shively ..................................73/146

2,898,764   8/1959   Kinsey et al. ...........................73/483

Primary Examiner—Donald O. Woodiel
Attorney—F. W. Brunner and Robert S. Washburn

[57] ABSTRACT

Apparatus for processing tires, in particular for discovering anomalies therein comprising means for chucking, inflating, and rotating a tire thereon about a vertical axis, means for operating on the tire chucked by moving a load roll to apply a radial load to the tire. The roll is mounted on a deflectable yoke secured on a carriage movable to and away from the tire. Means supporting the tire first prelocates and centers the tire, then moves the tire into coaxial registry with the chucking means.

10 Claims, 11 Drawing Figures

INVENTORS.
WILLIAM D. BRADEN,
RICHARD P. MARSHALL,
BY RICHARD J. GREENHORN &
ARNOLD S. BUSER

R. S. Washburn
AGENT

INVENTORS.
WILLIAM D. BRADEN,
RICHARD P. MARSHALL,
BY RICHARD J. GREENHORN &
ARNOLD S. BUSER

R. S. Washburn
AGENT

APPARATUS FOR PROCESSING CURED TIRES

This invention relates to the manufacture of pneumatic tires and particularly to the treatment or processing of tires after such tires have been cured. More particularly, the invention relates to apparatus for performing an operation on a cured tire, such as testing the tire to discover anomalies therein, and including means cooperating to move a tire rapidly and accurately into operative position in the apparatus.

Pneumatic tires for automotive and similar use, particularly for high speed highway use, ideally should be so constructed that the forces generated in the tire and acting between the road surface and the vehicle are perfectly regular and uniform throughout any complete revolution of the tire as it rolls on a smooth, straight, level road surface. Inevitably, during the manufacture of pneumatic tires, some deviations or variations from the ideal occur. Within limits established by practical experience, some deviations can be tolerated, but as the demands for increased speed, reduced vibration and noise, improved vehicle stability and handling, and like requirements in tire performance have increased, the permissible range of or tolerance for accumulated deviations in the finished tire from the ideal has become increasingly narrow. Tire uniformity, or relative freedom from deviations from the ideal, are known to relate particularly to variations found to exist in the forces exerted radially of and by the tire between the vehicle and the road surface, as well as in the forces exerted by the tire laterally, transversely to the plane of tire rotation. These and other deviations from the ideal are referred to in the present specification as anomalies.

Considerations of economy dictate that tires be moved in and between manufacturing operations, by mechanical means insofar as possible. While tires can be conveyed in generally any orientation of the tire, the movement of tires in horizontal orientation, with their normal axes of rotation being at least generally vertical, has been found convenient and is commonly preferred. It is also desirable that individual operations performed on tires require a minimum amount of human effort and attention.

It is a principal object of the present invention, therefore, to provide an apparatus for performing an operation on a tire and particularly an apparatus for discovering anomalies in tires automatically and in rapid sequence.

A further object of the invention is to provide for automatically loading a plurality of cured tires sequentially into operative relation with apparatus for performing an operation upon each successive tire.

Another object of the invention is to provide for moving a succession of tires individually into cooperative association with a tire processing device or apparatus while the tires are oriented horizontally, without requiring rotation of the tire about any axis other than its own axis of rotation as in normal use.

A further object of the invention is to provide for locating a tire at a predetermined distance from the position in the apparatus in which the tire will be processed while an immediately preceding tire is located for processing in the apparatus, so that by mechanically controlled movement of the tire, the same can be chucked with enhanced accuracy of location and orientation.

Still another object of the invention is the provision of apparatus adapted to discover anomalies in tires in which tires are automatically successively conveyed into cooperative position to be processed in the apparatus and in which tires may vary in outside diameter, width, and other dimensions excepting only bead diameter from tire to tire in a sequence.

Still another object of the present invention is to provide for prepositioning a tire a predetermined distance away from the position in which the tire is to be mounted for processing in the apparatus and then advancing the tire through the said predetermined distance to locate the tire accurately in register with the means mounting the tire for processing.

Yet a further object of the invention is to provide apparatus in which a roll or other operating device is brought rapidly into a first condition of engagement with an inflated tire mounted to be operated on in the apparatus and in which the roll or other device is then advanced less rapidly to a second condition of engagement with the tire.

The foregoing and other objects and advantages are achieved, according to the invention, by apparatus comprising means for chucking a tire for rotation about a first axis coincident with its own axis of rotation in normal use, it being generally preferred that the chucking axis be vertically oriented, means for operating on said tire mounted for movement toward and away from said first axis, and means for supporting a tire for movement along a path intercepting said first axis, including means for positioning the tire at a predetermined fixed location spaced along the path from said first axis, and means for moving the supporting means intermittently a distance sufficient only to move said tire from said predetermined location into coaxial registry with the first said axis.

The following description of a particular embodiment of the invention is by way of illustration and without intention to limit thereto the principles and features of the invention as may be employed in variations or modifications of the embodiment described herein with reference to the annexed drawings, except as set forth in the appended claims.

Figure 1:
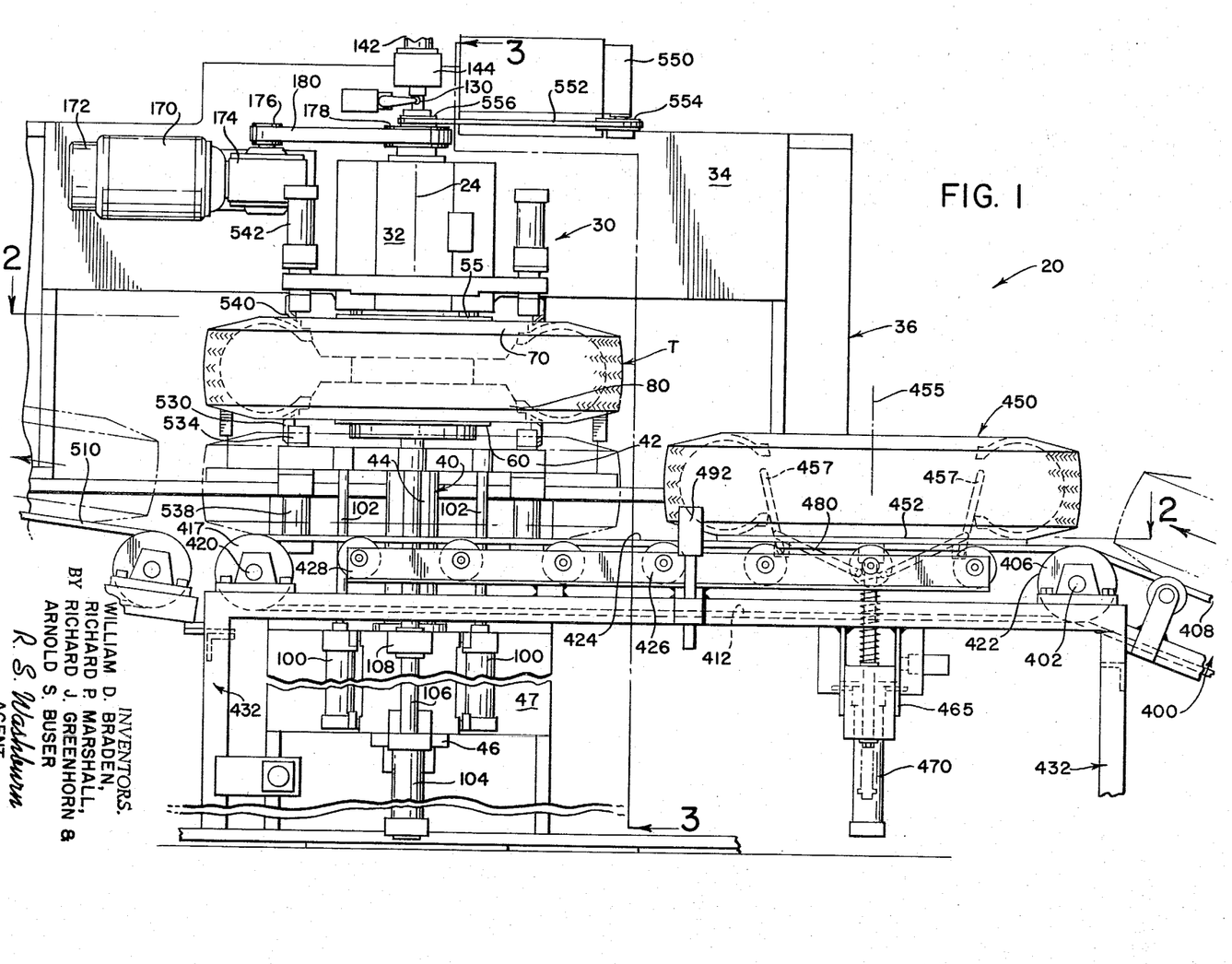
FIG. 1 is a view in front elevation of apparatus embodying the invention.
Figure 2:
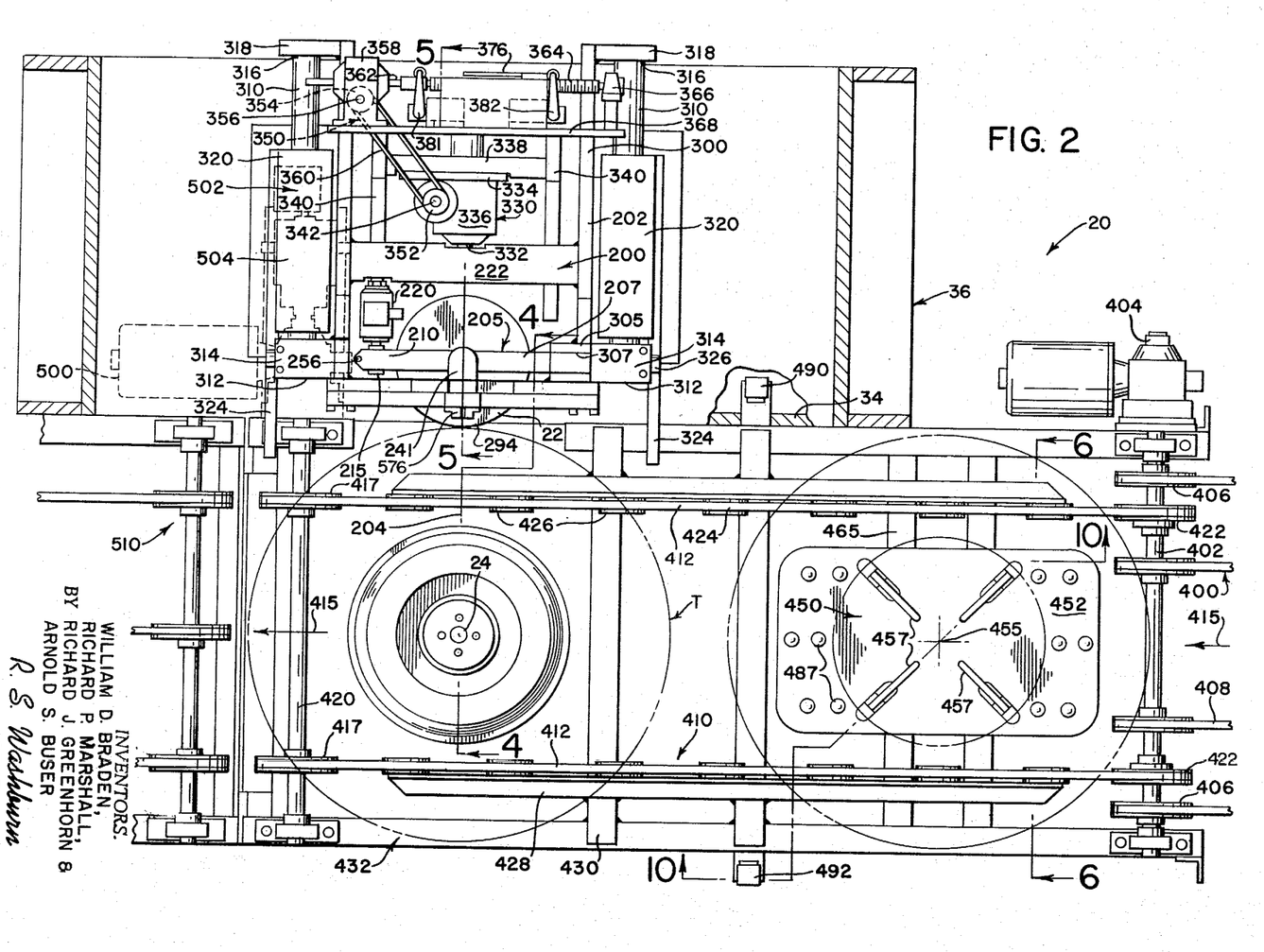
FIG. 2 is a plan view of the apparatus of FIG. 1, oriented as shown by the lines 2—2 of FIG. 1.

Referring now to the drawings, and particularly to FIGS. 1 and 2; the illustrative embodiment of the invention includes an apparatus 20 for discovering, measuring, and locating anomalies in the tire T and in particular variations in the radial force and in the lateral force generated by the tire as the tire is rotated in rolling contact with the load roll 22.

In the apparatus 20, means for chucking the tire T for rotation about a first axis 24, coincident with the tire axis of rotation of normal use, is provided by an upper chucking spindle assembly 30 which includes the spindle housing 32 fixed rigidly on the front wall 34 of the frame 36, and a lower chucking ram assembly 40 comprising the crosshead 42 rigidly secured to the elevating ram 44 which is slidable vertically in the ram guide housing 46 coaxially of, toward and away from, the spindle assembly 30. The housing 46 is fixed rigidly to the lower front wall 47 of the frame 36.

Figure 3:
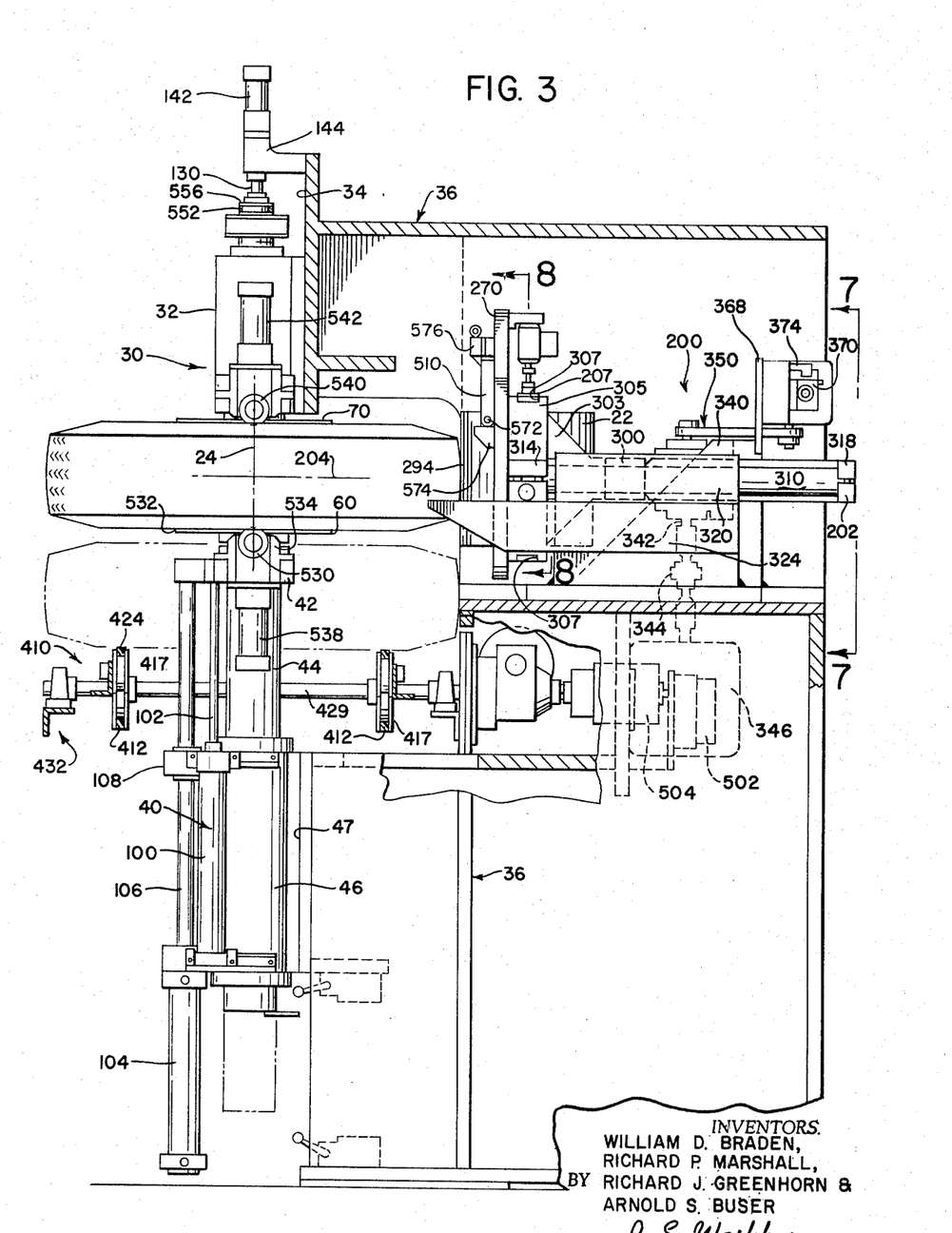
FIG. 3 is a view in elevation oriented as indicated by the section line 3—3 of FIG. 1.
Figure 4:
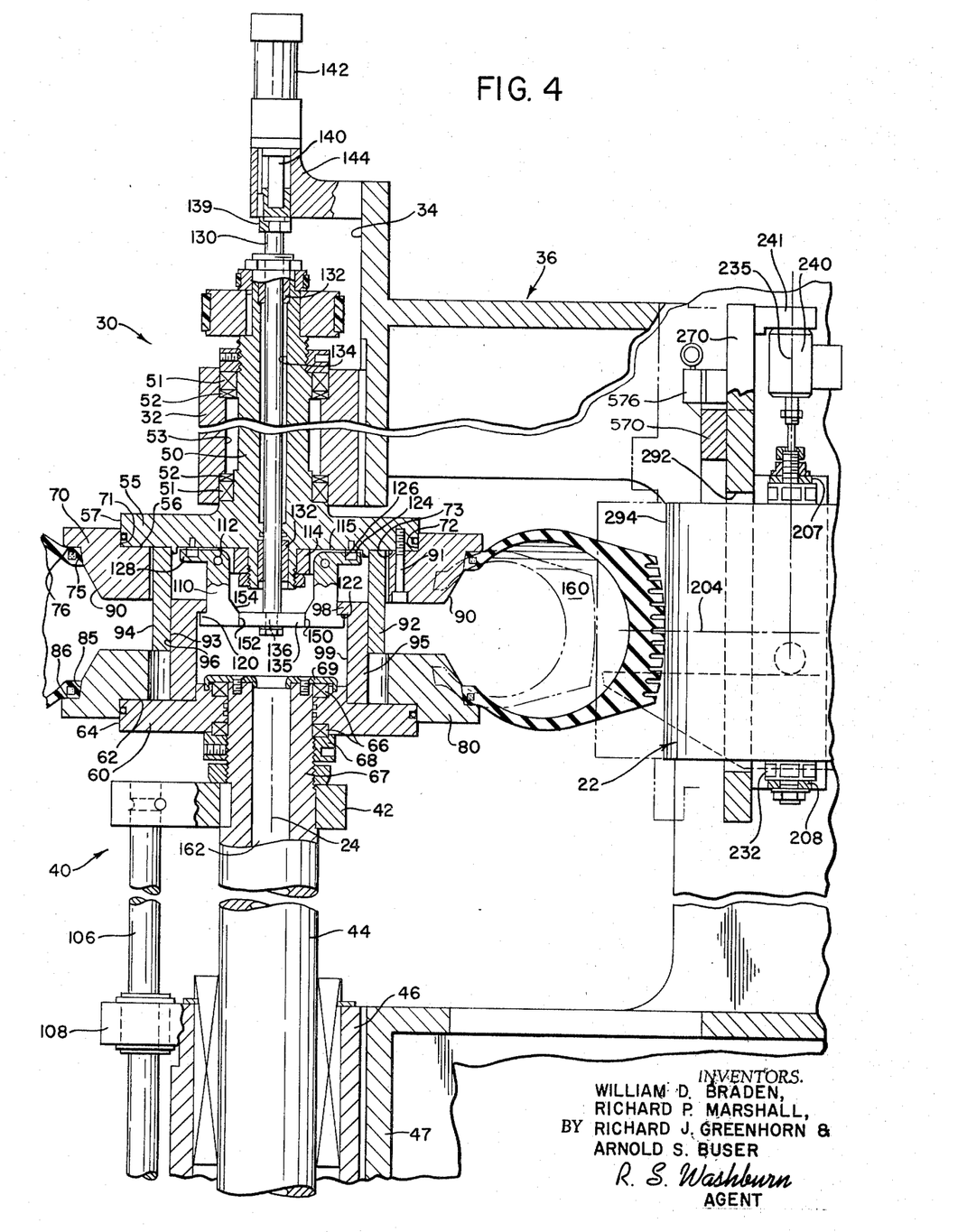
FIG. 4 is a view in transverse vertical section oriented as indicated by the section line 4—4 in FIG. 2.

Referring also to FIGS. 3 and 4; the assembly 30 includes a hollow spindle 50 mounted coaxially of the axis 24 by suitable radial bearings 51 and thrust bearings 52 secured in the axial bore 53 of the housing 32 for rotation about the axis 24 free of significant axial movement. A spindle plate 55 formed integrally on the spindle 50 has a downwardly facing plane annular surface 54 exactly perpendicular to the axis 24 and an outer cylindrical surface 57 of precisely predetermined diameter concentric with the axis 24. The assembly 40 includes a ram plate 60 having an upwardly facing plane annular surface 62 exactly perpendicular to the axis 24 and an outer cylindrical surface 64 of precisely predetermined diameter equal to the diameter of the surface 55. The plate 60 is mounted for rotation coaxially about the axis 24 by a pair of suitable radial bearings 66 secured coaxially on the end 67 of the ram 44 extending upwardly of the crosshead 42 between the bearing unit 68 and the retainer 69.

The upper chucking flange ring 70 is provided with a counterbore 71 the wall 72 of which is snugly fitted to the cylindrical surface 57 and the floor 73 of which is snugly fitted to the annular surface 56 to locate the circumferential seat 75 and the flange 76 for true coaxial rotation with respect to the axis 24. The lower chucking flange ring 80 is identical in all significant respects and is fitted in like manner onto the ram plate 60 so that the seat 85 and flange 86 of the ring 80 and the seat 75 and flange 76 of the ring 75, respectively, cooperate to engage and locate respective bead portions of the tire in a manner similar to the engagement thereof with the wheel center or rim on which the tire is to be mounted for service. Thus the upper or spindle assembly and the associated flange ring are positively located and immovable axially so as to maintain exact alignment of the radial plane of symmetry of the tire with respect to the line of action of the load roll. Differences in the width between beads of successive tires mounted for processing are accommodated without significant effect upon the axial location of the radial plane of symmetry of the tire, and the flange rings 70 and 80 can be interchanged to accommodate differing bead diameters.

Each flange ring 70,80 is also provided with a pilot cone 90 for guiding the wheel center engaging surface of the tire, commonly referred to as the bead or beads, into suitable registry with the respective seats 75,85. Each flange ring 70,80 is removably affixed to the respective plate 55,60 by a plurality of capscrews represented by the capscrew 91, and is adapted to receive tires having a common bead diametral size.

A pilot member 92 of a suitable hard bronze having coaxial cylindrical inner 93 and outer 94 walls is rigidly secured coaxially on the spindle plate 55. The wall 93 is telescopically engageable in concentric guiding relation with the outer cylindrical wall 96 of a lower pilot member 95 of suitably hardened steel which is secured rigidly and coaxially on the ram plate 60. A radially inward latch abutment flange 98 projects from the inner cylindrical wall 99 of the member 95.

Means for effecting relative axial movement between the flange rings 70,80 is provided by a pair of air cylinders or the like 100 secured to the frame 36 and having their respective piston rods 102 connected to the crosshead 42 so that outward movement of the rods from their respective cylinders elevates the ram 44 to move the flange ring 80 coaxially toward the ring 70 and to telescopically engage the upper and lower pilot members 92 and 95, thereby locating the lower plate 60 in precise concentricity with the upper plate 55. To insure smoothly controlled movement of the ram 44, a conventional speed control oil cylinder 104 is secured to the ram guide housing 46 and frame 36. The piston rod extension 106 connects the crosshead 42 with a piston within the cylinder 104 and is extended slidably through a guide bracket 108 for movement parallel to the axis 24, and prevents rotation of the ram 44 relative to the axis 24.

In order to latch the flange rings 70 and 80 in predetermined axially spaced relation relative to each other, and to release them when appropriate, a plurality of latch dogs 110, spaced arcuately about the axis 24, are mounted pivotally on pins 112 secured in a latch mounting spider 114 which in turn is coaxially secured rigidly to the surface 115 of the spindle plate 55. Each dog 110 is provided with an integral latching tooth 120 extending radially outwardly with respect to the axis 24 and engageable with the radially extending annular face 122 of the abutment flange 98. The individual latching dogs 110 are biased to swing out of engagement with the abutment flange 98 by the springs 124 acting between the spindle plate 55 and the bottoms of the respective counterbores 126 located in radially outward extensions 128 of each dog 110. A chuck latching rod 130, which is supported corotatably with the spindle 50 and for movement longitudinally of itself in a pair of linear antifriction slides 132 fixed in the bore 134 of the spindle 50, has a cam disc 135 rigidly fixed to its lower end 136. At its upper end, the rod 130 is connected to be rotatable relative to and moxed axially by a fitting 139 attached to the piston rod 140 of a chuck latch operating cylinder 142 which is mounted on the guide bracket 144 affixed to the frame 36. The fitting 139 is keyed to slide without rotation in the bracket 144. In the position of the disc 135 and the latching dogs 110 illustrated in FIG. 4, the peripheral surface 180 of the disc engages the cam rest 152 of each of the dogs 110 to maintain the engagement of the latching teeth 120 with the abutment flange 98. As the latch rod 130 is withdrawn upwardly by action of the latch cylinder 142, the peripheral surface 150 of the disc moves axially out of engagement with the cam rests 152, permitting the springs 124 to urge the dogs 110 pivotally to engage the cam ramp 154 of each dog with the disc 135 and to pivot the dogs 110 out of engagement with the abutment flange 98, unlatching the assembly 40 and flange ring 80 for movement away from the upper assembly 30. When the ram assembly 40 is raised to move the flange ring 80 toward the flange ring 70 to a spacing therebetween equal to or less than the predetermined spacing required for the tire to be tested, the latch rod 130 is moved downwardly so that the peripheral surface 150 of the disc 135, by movement relative to the ramps 154, urges each of the dogs 110 to swing radially outwardly to locate the teeth 120 in abutting or latching relation with the flange face 122. To achieve precision in the alignment of the rings 70 and 80, and the seats thereon engaging a tire, the surfaces 122 are precisely finished to be square and concentric with the axis 24 after the spindle assembly 30 is put together.

The upper or spindle assembly 30 and lower or ram assembly 40 are provided with suitable fluid pressure seals and cooperate with the tire being operated on to provide a chamber 160 for the retention of inflation air admitted thereinto through the passage 162 in the ram 44 from a suitable source (not shown) of air under pressure.

Making reference particularly to FIGS. 1 and 4; in order to rotate the chucking means at a particular preselected angular speed, the apparatus 20 includes drive means comprising a synchronous motor 170 having a brake 172, a gear reducer 174 driven by the motor 170 and having a toothed driving pulley 176 corotatably mounted on its output shaft. A toothed driven pulley 178 is corotatably secured to the spindle 50 and an internally toothed flexible drive belt 180 of the type commonly referred to as a timing belt drivingly connects the pulleys 176,178. The belt drive described provides for relatively shockless starting and stopping of the rotation of a tire. The brake 172 provides for stopping the spindle, and a tire being rotated thereby, at a predetermined angular position.

Referring to FIGS. 2 and 3; the previously referred to means for operating on a tire is, in the apparatus 20, means for discovering anomalies in the tire, provided by a force measuring assembly 200 including a substantially rigid carriage 202 mounted in the frame 36 for movement along a direction line 204 of action, perpendicularly intersecting the axis 24, which preferably lies in the mid-circumferential plane of tires operated upon. Affixed to the carriage 202 is a yoke 205 comprising a matched pair of flex bars 207,208 of rectangular cross-section, each of which is rigidly secured to the carriage 202 as a cantilever beam extending generally perpendicular to a plane defined by the axis 24 and the line of action 204, and respectively at equal distances above and below the line 204. The free ends 210,211 of the flex bars 207,208 are connected by a strut 215 (best seen in FIG. 8) to the longitudinal center of which is connected the conventional strain gauge load cell 220, which is secured to a main cross member 222 of the carriage.

Alternatively, for the added purpose of discovering such anomalies as differing radial forces generated by portions of a tire on opposite sides of its mid-circumferential plane or radial plane of symmetry, which differing forces can give rise to instabilities in performance, sometimes referred to as conicity and sinuosity or weaviness, the single load cell 220 can be replaced by a pair of equal load cells connected between the strut 215 and the cross member 222 at spaced locations equidistant, respectively, above and below the mid-circumferential or equatorial plane of the tire and oriented parallel to the line 204.

In either case, using the load cell 220 shown, or the pair of load cells described, the output or outputs of the load cells are connected to electrical circuitry, not within the scope of the present invention, adapted to convert and display or record such output in useful form.

Load cells particularly suitable for use in the assembly 200 are available from The Revere Corporation, division of Neptune Meter Corporation, Wellingford, Conn.

Figure 5:
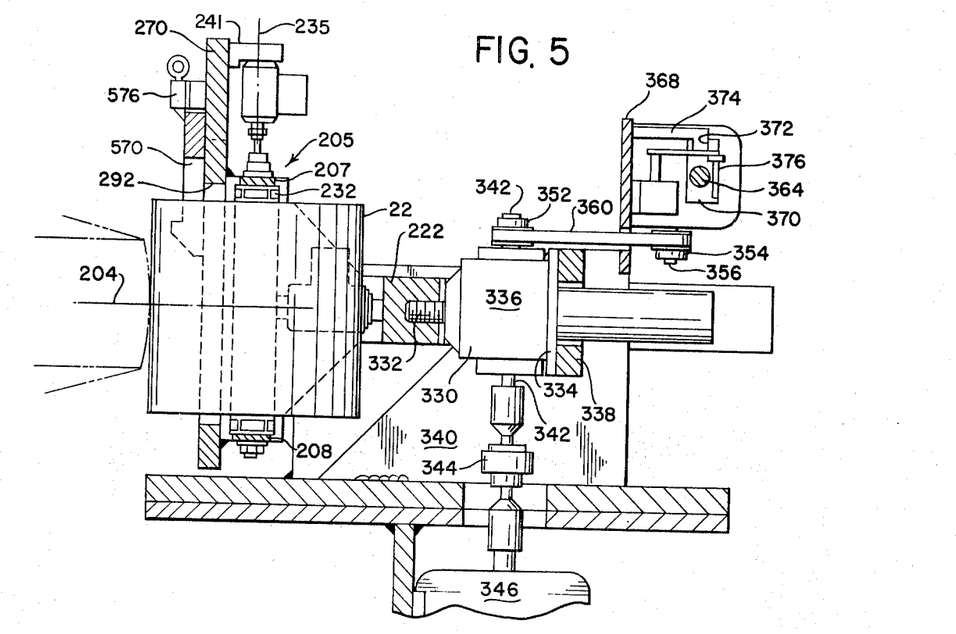
FIG. 5 is a view in vertical cross-section, enlarged, oriented as indicated by the section line 5—5 in FIG. 2.
Figure 8:
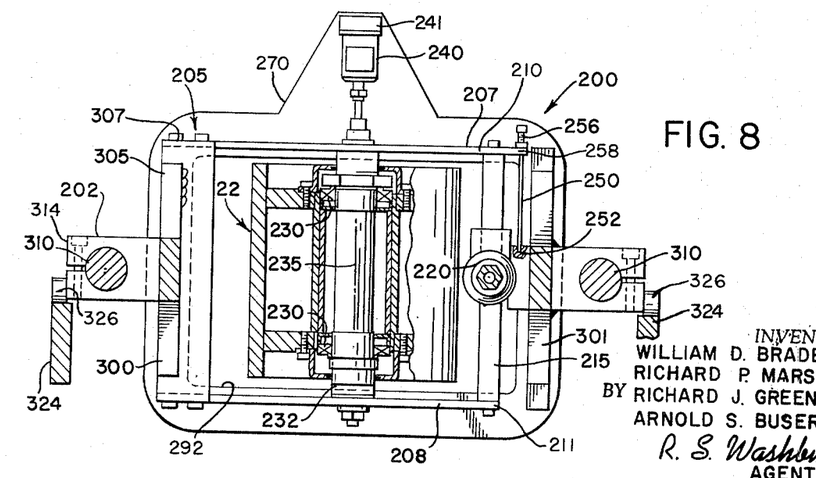
FIG. 8 is a partial view in elevation oriented as indicated by the section line 8—8 in FIG. 3.

Referring also to FIGS. 5 and 8, the load roll 22 is mounted for rotation on precision bearings 230 mounted on a central shaft 232 secured to and extending between intermediate portions of the flex bars 207,208 so that the rotation axis 235 of the load roll 22 is parallel to the chucking axis 24 and lies in the plane defined by the axis 24 and the line 204 of action of the carriage 202. The axial length of the roll 22 is bisected by the line of action 204. The cross-sections of the flex bars 207,208 are selected and oriented so that variations in the forces exerted radially of and between a tire T and the load roll 22 result in small but measurable elastic deflections of the yoke 205 in directions respectively parallel and perpendicular to the line 204, and orthogonally with respect to the axis 24, without significant movement or deflection of the carriage 202 or of the frame 36 and so that the lateral force variations which tend to move the load roll 22 in directions parallel to its own axis 235 likewise produce small but measurable elastic deflections of the yoke 205 without significant effect on the carriage 202 or the frame 36. In the apparatus 20, the flex bars 207,208 have cross-sectional dimensions of 2.0 in. parallel to the line 204 of action and of 0.4 in. parallel to the axis 235 of the load roll. With a load roll of 33 ⅝ inches, the respective dimensions are 4.0 in. and 1.0 in. of the bars. To detect the deflections of the yoke 205 axially of the load roll 22, a second load cell 240 is connected between bracket 241 mounted on carriage 202 and center shaft 232 in alignment with the axis 235 of the load roll 22.

In order to maintain the generally horizontal orientations of the flex bars 207,208, a slender rod 250 (FIG. 8) may be placed parallel to the axis 235 with its lower end received freely in a socket 252 fixed in the carriage 202, and its upper end in a socket formed axially in the end of the screw 256, which is adjustably fixed in an extension 258 of the upper flex bar 207. Forces exerted between the load roll 22 and a tire rolling thereagainst tend to deflect the bars 207,208 in directions parallel to and perpendicular to the line 204. The respective load cells 220 and 240 tend to resist such deflections and are thereby themselves deflected by amounts proportional to the respective deflecting forces. However, the flex bars 207,208 also, by their stiffness, resist the forces applied, making possible the use of relatively inexpensive commercial load cells within their preferred deflection range.

A particular advantage of the invention results from the use of the flex bars and the elimination of sliding friction in the force measurement system. Neither sliding carriages nor pivoted levers are free from frictional effects tending to result in erratic measurements in a force measuring system, while the completely elastic deflection of the yoke 205 provides both accuracy and sensitivity.

To ensure the transmission of any lateral forces generated by the tire T to the load roll 22 while the same are in rolling engagement, the surface of the roll 22 is preferably provided with a non-skid surface. A very satisfactory non-skid surface is a tungsten carbide surface applied uniformly by a spray coating commercially available from Functional Products, Inc., of Geneva, Illinois.

Figure 7:
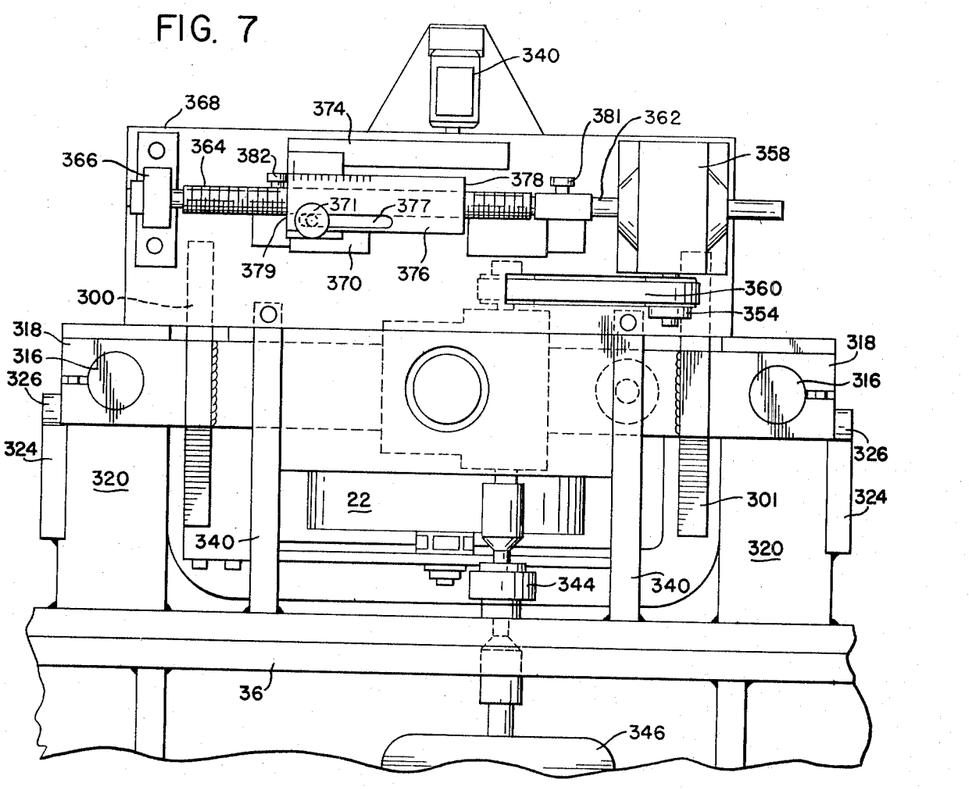
FIG. 7 is a partial view of the rear elevation of the apparatus of FIG. 1 oriented as indicated by the line 7—7 in FIG. 3.
Figure 9:
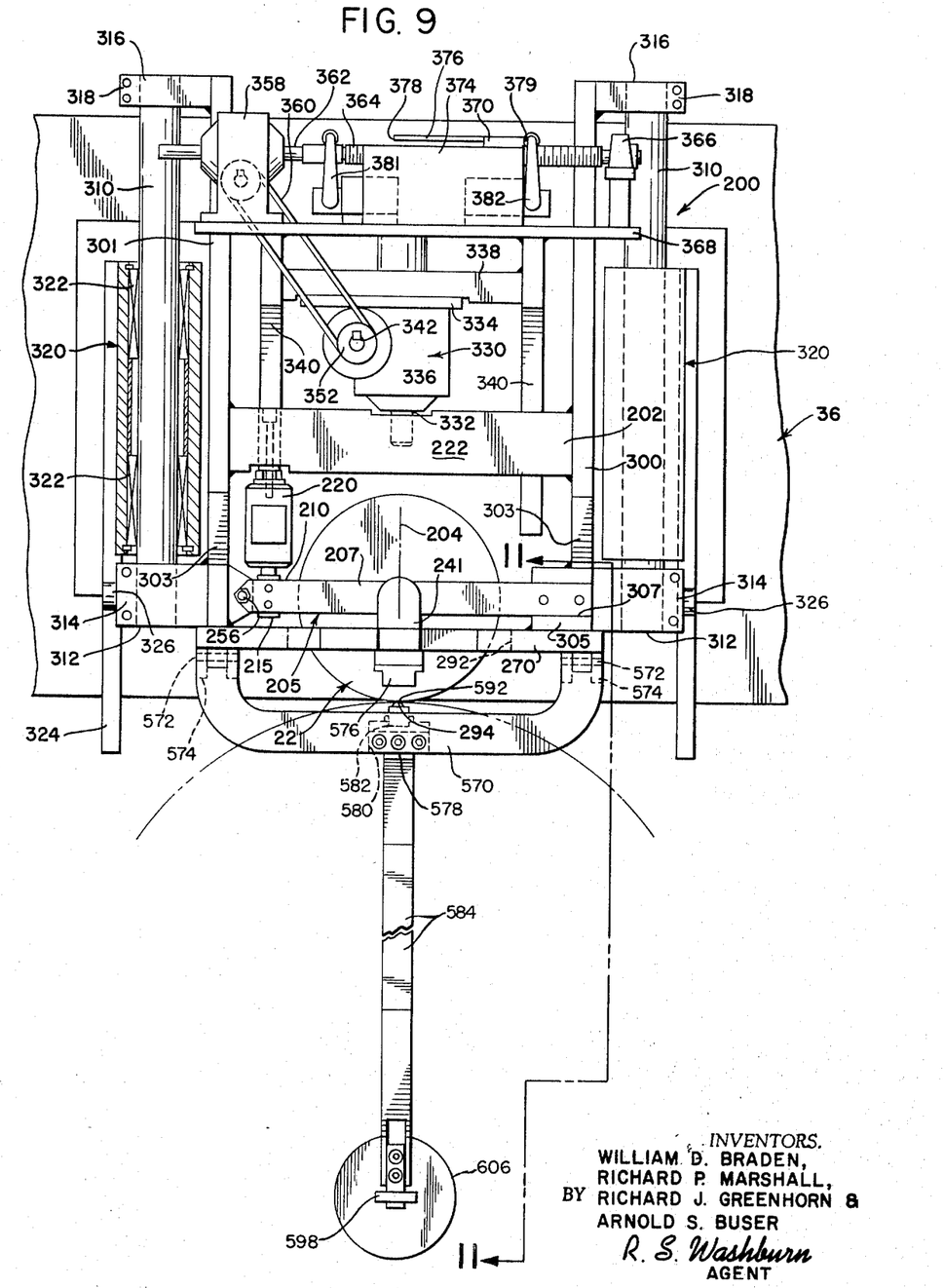
FIG. 9 is a partial plan view of the apparatus as seen in FIG. 2, enlarged, and showing dead weight calibrating means.

Referring now to FIGS. 7, 8, and 9; the carriage 202 comprises the front plate 270 having an opening or window 292, accommodating an arcuate portion 294 of the load roll 22, and a parallel pair of side members 300,301 extending rearwardly perpendicularly from the plate 270, and placed laterally of the window 292. The side members are widened to form triangular gussets 303 bracing the plate 270 and are rigidly secured to the plate by welding. The main cross member 222 extends parallel to the plate 270 and between the side members 300,301 to which it is joined, by welding, rearwardly of the roll 22. A yoke mounting block 305, having slots 307, in the upper and lower ends in which the flex bars 207,208 are anchored, is affixed by welding to the plate 270 and to the side member 300. The carriage 202 is supported by a pair of parallel guide shafts 310, the forward ends 312 of which are clamped in pedestals 314 welded on and extending laterally outwardly from the forward ends of the respective side members 300,301 and the rearward ends 316 of which are clamped in pedestals 318 welded on and extending laterally outwardly from the rearward ends of the respective side members 300,301.

To constrain the carriage 202 to movement along the line 204 of action without significant deviation therefrom, a pair of guide members 320 each equipped with suitable linear slide bearings 322 respectively receive the shafts 310 for sliding movement therethrough. The members 320 are rigidly attached to the frame 36 in appropriate alignment parallel with the line 204 of action. A cantilever support 324 is rigidly secured to each of the members 320 to support the front end of the carriage 202 by cooperation with the cam rollers 326 rotatably mounted on the pedestals 314. Inasmuch as the larger load roll, of 33⅝ inch diameter, referred to above, requires less forward or outward movement of its carriage than is required by the carriage 202 and the 10-inch roll 22 shown, the supports 324 and rollers 326 can be omitted in apparatus using the larger roll.

Movement of the carriage 202 toward and away from the tire and the first or chucking axis 24 is provided by means of a screw jack 330, the screw 332 of which is secured to the cross member 222. The base 334 of the jack housing 336 is secured to a plate 338 extending between the buttresses 340 forming a part of the frame 36. The operating shaft 342 of the screw jack 330 is connected by a suitable flexible coupling 344 to the output shaft of a two-speed electric motor 346, the high speed windings of which are energized to drive the screw jack 330 to advance the carriage 202 rapidly to engage the load roll 22 with the tire T and apply thereto a predetermined initial load. The load applied causes a deflection of the yoke 205 detected by the load cell 220 whereupon the high speed windings are deenergized and the low speed windings energized to continue the advance of the carriage 202 at a lesser rate to attain a predetermined radial force on the tire T also detected by the load cell, whereupon the two-speed motor 346 is deenergized and the carriage 202 maintained at the position effecting the testing load on the tire by the screw jack 332. The motor 346 is preferably provided with conventional brake means (not shown) to minimize over-travel of the carriage as the motor is deenergized.

Referring in particular to FIGS. 5 and 7; in order to provide an analog of the position of the carriage 202 relative to the axis 24, transmission means including a pulley 352 corotatably mounted on the operating shaft 342 of the screw jack 330, and a pulley 354 corotatably mounted on the input shaft 356 of a right angle gear unit 358, are drivingly connected by a timing belt 360. The output shaft 362 of the gear unit 358 is connected coaxially with a screw 364 supported at its distal end by a pillow block 366 mounted on a plate 368 affixed to the frame 36. An indicator nut 370 threadedly engaged with the screw 364 for longitudinal movement therealong has a wing and slot 372 engaged slidingly with a slide 374 affixed on the plate 368. Other transmission means can be employed, for example, the shaft 356 can be directly or coaxially connected with the shaft 342. Limit setting means in the form of a scale 376 having an adjustment slot 377 is adjustably affixed to the nut 370 for movement therewith by a thumbscrew 371. The end surfaces 378,379 respectively of the scale 376 engage limit switches 381,382 which are operative to limit the movement of the carriage 202 to a predetermined range.

In the interest of reducing the non-productive portion of the cycle in the apparatus, the load roll surface 294 is preferably located, at rest, only a very small distance from the peripheral surface of the tire to be measured. The scale 376 is positioned to halt the inward, away from the tire, movement of the roll 22 so as to locate the surface 294 no more than about one-eighth inch from the tire.

The apparatus 20 is particularly adapted to apply a predetermined test load radially of the tire as has been described above. It is contemplated, moreover, within the scope of the invention that a tire can be tested for the presence of anomalies at a predetermined amount of radial deflection. This can be achieved in the apparatus 20 by the use of a suitable scale 376 having its end surface 378 located to cooperate with the limit switch 381 so as to position the load roll 22 at a predetermined radial distance from the axis 24 corresponding to the desired deflection of a tire to be tested. Furthermore, the position of the scale 376 while the roll 22 is in engagement with the tire being tested indicates the actual loaded radius of the tire, and can be calibrated for direct reading of such radial dimension and/or connected by known means to indicate or record such dimension.

Turning again to FIGS. 1 and 2; the apparatus 20 includes, in accordance with the invention, means for supporting a tire for movement along a path including means for positioning the tire at a predetermined location spaced along the path from the axis 24, and means for moving the support means and a tire thereon between the predetermined location and a position wherein the tire is concentric with the axis 24. In the apparatus 20, in order to receive a succession of tires from a supply thereof, a first conveyor 400, the slope of which is adjustable to accommodate the elevation of supply means (not shown) from which tires are received by the apparatus 20, includes drive means comprising the head shaft 402 connected to a gear motor 404. A set of conveyor belt pulleys 406 are mounted in suitably axially spaced relation corotatably on the shaft 402 to drive the conveyor belts 408 intermittently to move tires one at a time to the apparatus 20.

The supporting means in the present apparatus 20 comprises a conveyor 410 having a pair of conveyor belts 412 extending parallel with and spaced equilaterally of the centerline of the path travelled by the tires and designated by the arrows 415. Each belt 412 is looped about the head pulleys 417 corotatably affixed in suitably spaced relation upon the head shaft 420 and about a spaced pair of belt pulleys 422 mounted for rotation on and relative to the shaft 402. The upper reach 424 or supporting surface of each belt is carried by a plurality of idler pulleys mounted rotatably on the side members 428 which are secured to the cross members 430 of the conveyor frame 432 which is fixed relative to, and may be a part of, the frame 36. The conveyor 410 supports a tire horizontally with its axis of rotation vertically, for movement along the path 415 in a direction generally perpendicular to the plane defined by the axis 24 and the line 204 so that the centerline 415 intersects the axis 24.

Figure 6:
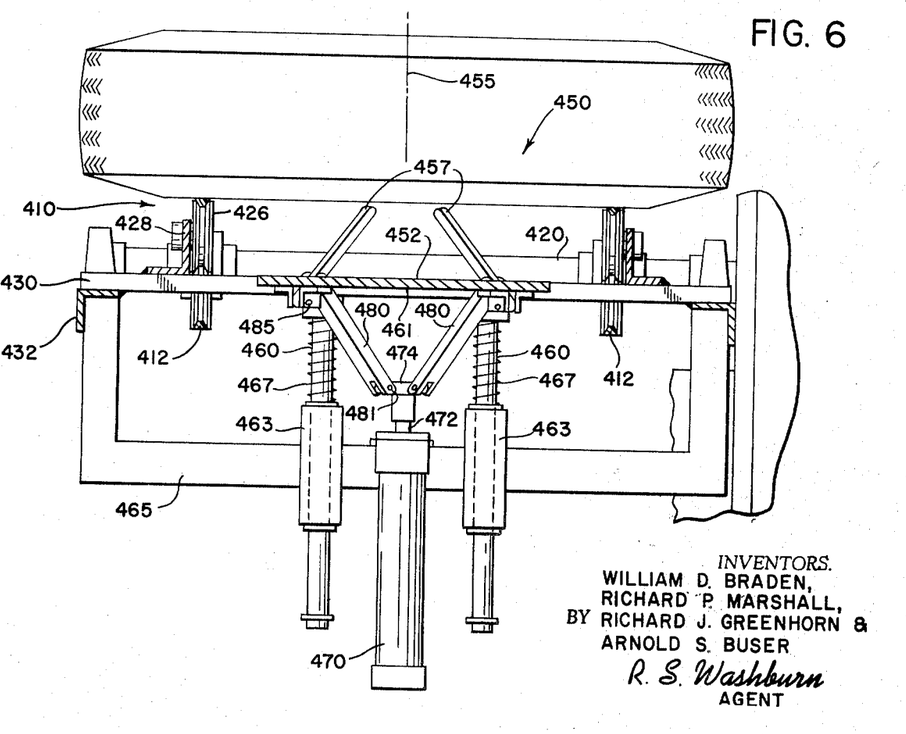
FIG. 6 is a view in elevation oriented as indicated by the section line 6—6 in FIG. 2.
Figures 10, 11:
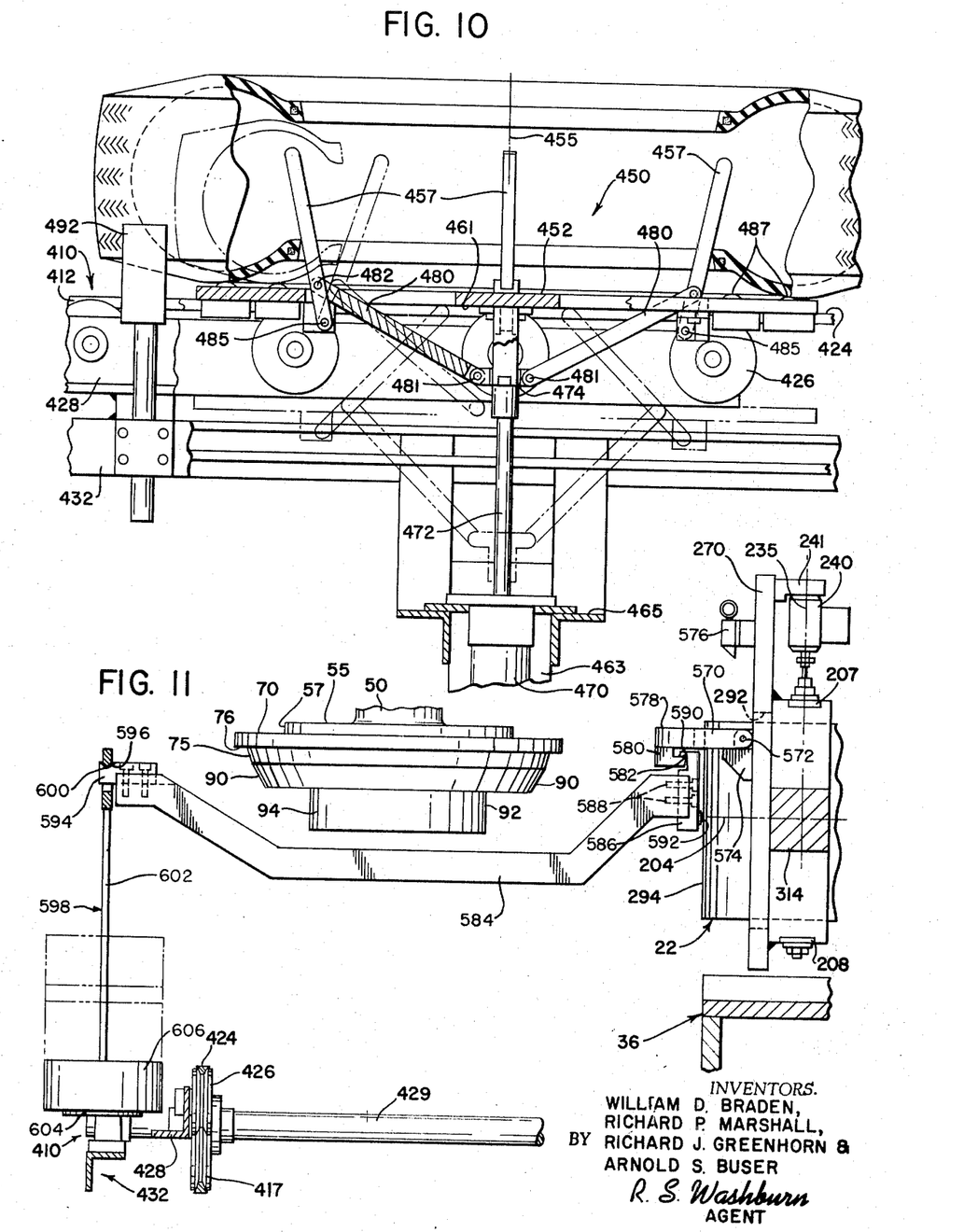
FIG. 10 is a view in sectional elevation taken along the section line 10—10 of FIG. 2.
FIG. 11 is a partial elevation view of the apparatus taken as shown by the line 11—11 in FIG. 9.

Turning also to FIGS. 2, 6, and 10; in order to center a tire at a position spaced from the axis 24 along the path 415, the apparatus 20 includes centering means in the form of a centering device 450 comprising an elevator plate 452 which is movable in a direction perpendicularly of itself along a vertical axis 455 at the centering location. A plurality of fingers 457 are mounted swingably on the plate 452 to swing in planes radial to the axis 455 and spaced angularly thereabout. A pair of guide plungers 460 are secured perpendicularly to the lower surface 461 of the plate 452, and are slidable respectively in a pair of sleeves 463 rigidly attached to a cross member 465 of the conveyor frame 432. A helically coiled compression spring 467 surrounding each plunger 460 and acting between the plate 452 and the respective sleeve 463 urges the plate 452 upwardly toward its upward position in lifting engagement with a tire sidewall. The plate 452 is moved downwardly to its lower position below the reach 424 by the action of an air cylinder 470, fixed to the cross member 465 between the sleeves 463. The rod 472 of the cylinder 470 has an end fitting 474 moved along the axis 455 by the cylinder 470. The actuating links 480 are each connected at one end by a pivot pin 481 to the fitting 474 and at the other end by a pin 482 to a respective one of the centering fingers 457 at a location spaced therealong from its pivot mounting 485. Movement of the fitting 474 outwardly of the cylinder 470 cooperates with the springs 467 acting both to swing the fingers 457 radially outwardly of the axis 455 and into engagement with a wheel center engaging surface or bead portion of a tire to be centered by the device 450 and to elevate the plate 452 into its upper position, lifting the tire thereon out of contact with the conveying belts 412 and insuring the positive centralizing of the tire axis with the axis 455. The centering plate 452 is provided with a multiplicity of conventional ball rests 487 which protrude slightly above the plate 452 to reduce the frictional resistance to movement of the tire relative to the plate. The springs 467 are sufficiently stiff to ensure that the tire and plate are moved clear of the belts 412 before the fingers 457 complete their swing movement against the tire.

The centering device 450 is actuated in response to a signal provided by the photo-electric cell 490 when the beam from the light source 492 is interrupted by the movement of a tire along the conveyor 410.

Reverting to FIGS. 1 and 2; in order to move the tire along the path 415 from the location determined by the centering device 450, the head shaft 420 is coupled to a gear motor 500 having an integral brake and to a conventional three-revolution switch 502 operative to deenergize the motor 500 and actuate its brake in response to a predetermined movement of the belts 412 which movement is preset to correspond to the distance between the axis 24 and the axis 455.

In the apparatus 20, the movement of the belts 412 to move the tire between the centering device 450 and the axis 24 of the chucking assemblies 30 and 40 is 36 inches. The three-revolution switch 502 is connected to the shaft 420 so that the switch 502 rotates about 2½ revolutions and there effects an electrical contact operative to stop the movement of the conveyor 410. After the tire is chucked, the conveyor 410 is again moved to bring a next succeeding tire toward the centering device 450 during which movement the switch 502 completes its third revolution and actuates the clutch-brake device 504 to disconnect the switch 502 from the head shaft 420 with the switch in its starting or home position ready for the next cycle. As the succeeding tire interrupts the light beam to the photocell 490, a signal therefrom operates to stop the conveyor 410, to reset the clutch-brake device 504, and to reconnect the switch 502 with the shaft 420 for the next cycle.

It is preferred that the conveyors 400,410 and the centering device 450 operate only during portions of the cycle other than actual detecting, measuring, and recording of force variations or other anomalies in a particular tire. It will be apparent to persons skilled in the most closely related arts also that the apparatus 20 is preferably insulated from undue vibration or like disturbance, which could affect the accuracy or repeatability of measurements made by the apparatus.

The same movement of the conveyor belts 412 which advances a tire from the centering device 450 to coaxial registry with the chucking axis 24 also moves a completed tire, demounted from the chucking means and deposited on the conveyor 410, to a take-away conveyor 510 for removal to a subsequent operation or use.

The tire next to be processed, which has been moved into axial registry with the chucking axis 24, is engaged by the lower flange ring 80 as the same is elevated by the ram 44 and is then moved upwardly to engage the tire also with the upper flange ring 70. As the flange ring 80 is moved toward the ring 70, the wheel center engaging portions of the tire are centered and engaged by the respective pilot cones 90 to create a seal sufficient to retain inflation air in the chamber 160. Continued upward movement of the plate 60 moves the pilot members 92 and 95 into telescopic engagement, moving the abutment flange 98 to permit the latching dog teeth 120 to engage therewith. The latching rod 130 is moved downwardly to move the dogs 110 outwardly to engage the flange 98 and air is admitted to inflate the tire to a predetermined test pressure which pressure, about 30 pounds per square inch in the apparatus 20, for usual passenger car tires, is sufficient to insure that the respective bead portions of the tire move axially outwardly against the flanges 76 and 86 so as to position the tire in true coaxial relation with the chucking axis 24 insofar as possible in the same relation to the flange rings as the tire will have with the wheel center or rims on which it will be mounted for use.

Referring to FIGS. 1 and 3; in order to demount the tire from the respective flange rings 70 and 80 upon completion of the operation performed on the tire, inflation air is discharged from the chamber 160 after which the latching dogs 110 are released. The demounting rolls 530 are moved upwardly to engage the sidewall portion of the tire outwardly of and immediately adjacent the perimeter 532 of the lower flange ring 80, while the tire continues to rotate, to dislodge the tire from the ring.

The demounting rolls 530 are rotatably mounted in fittings 534 carried on the piston rods of the fluid power cylinders 538 fixed on the crosshead 42. A suitable lubricant can be projected onto the tire by nozzle means (not shown) mounted adjacent each demounting roll 530. After about one-half revolution of the tire, the upper demounting rolls 540 are actuated by their respective cylinders 542, while the tire continues to rotate, to dislodge the upper wheel center engaging portion of the tire from the upper flange ring 70. When the tire is so dislodged, the elevator ram 44 descends, carrying the demounted tire freely thereon, and deposits the tire on the supporting surface 424 provided by the conveyor belts, ready for movement by the conveyor 410 onto the take-off conveyor 510.

The deflection signals produced by the load cells 220 and 240 in response to forces generated by the tire radially between the load roll 22 and the axis 24, as well as parallel to the axes 24 and 235 are communicated to electronic circuit means well known in the related arts and outside the scope of the present invention. The signals received in such electronic circuit means are coordinated therein with the precise angular location of the anomalies producing the respectively measured deflections by pulse signals generated by a pulse generator 550 operative to produce a single pulse at each successive, preselected increment of its own rotation and which is mounted on the frame 36 and connected by a timing belt 552 looped about a driven pulley 554 on the generator 550 and a driving pulley 556 corotatable with the chucking spindle 50. Alternatively, the pulse generator 550 may be drivingly connected to the output shaft of the gear reducer 174.

Electric and pneumatic controls operative to sequence the successive functions of the elements of the apparatus 20 described are also well known and form no part of the present invention, hence a description thereof is deemed unnecessary.

With reference in particular to FIGS. 9 and 11; in order to provide for periodic calibration of the load cells 220 and 240, the apparatus 20 is adapted to cooperate with means for applying a dead weight load on the roll 22. Calibration of the load cell 240 requires only the application directly on the roll of one or more individual known weights by which the load cell 240 and its associated circuitry can be calibrated. Because of the preferred vertical orientation of the axis 235, the calibration of loads applied normally to that axis is provided in the apparatus 20 by means comprising an arch bar 570 which is mounted swingably about hinge pins 572 carried in the blocks 574 affixed securely on the front plate 270 of the carriage 202. When not in use, the arch bar 570 is held in a rest position parallel to the front plate 270 by a spring latch 576. For use in calibrating the load cell 220, the arch bar is swung about 90° outwardly and downwardly to locate its mid-arch portion 578 in front of the roll 22, the bar 570 being held there by the stops formed on the blocks 574. A block 580 having a knife-edged fulcrum 582 is rigidly secured to the mid-arch portion 578, the knife edge being held at a precisely predetermined elevation above the line 204 and perpendicular to the plane of the axis 24 and the line 204. A load or calibrating lever 584 has a shorter and vertical lever arm provided by a block 586 rigidly secured to the generally horizontal body of the lever 584 by the cap screws 588. The block 586 is provided near its upper end with a V-shaped seat 590 of appropriately hardened material for engagement with the fulcrum 582 and with a stud or pressure pad 592 downwardly exactly from the seat to bear upon the cylindrical periphery of the roll 22 at the line of action 204, the distance between the seat 590 and the stud 592 defining the shorter arm of the lever 584. At the outward extremity of the lever body, a block 594 attached to the lever body is provided with a V-shaped seat 596 of suitably hardened material for the reception of a dead weight hanger 598 which has a knife edge 600 of suitably hardened material which is received in the seat 596 and supports a dead weight hanger rod 602 terminating in its lower end in a disc 604 adapted to support one or more of precisely known calibrating weights 606 which can be applied in desired combinations in order to calibrate the full range of the deflection to be accommodated by the load cell 220 and the circuitry associated therewith. The distance between the seat 596 and the stud 592 define the longer arm of the lever. The leverage ratio of the longer arm to the shorter arm is, in the present apparatus, 10:1. Therefore, dead weights of from 5 to 20 pounds provide increments of calibration of 50 to 200 pounds on the load cell and can readily be applied and removed manually so as to provide for periodic calibration of the apparatus sufficient to secure its accuracy and repeatability in use.

It is believed that the operation of the apparatus 20 is fully apparent from the foregoing description thereof and that such operation may be summarized as follows:

Tires, which may be assorted in respects other than bead diameter, are moved one by one successively from a production line conveyor or other supply onto the conveyor 410. Interruption of the light beam to the photocell 490 by the movement of a tire into the beam actuates the centering device 450 to raise the plate 452 and swing the fingers 457 to move the rotation axis of the tire into concentricity with the location axis 455. The tire is then lowered to the conveyor 410 and the conveyor is advanced a distance corresponding to the distance between the location axis 455 and the chucking axis 24. The lower flange ring 80 is elevated, moving the pilot cone 90 into the central opening of and engagement with the lower bead portion of the tire, lifting the tire to engage its upper bead portion with the upper flange ring 70 carried by the chucking spindle 50. Continuing upward movement of the ram 44 seals the tire sufficiently to retain in the chamber 160 an inflating air pressure and permits engagement of the latching dogs 110 with the abutment flange 98 whereupon the latch dog cylinder 142 is actuated. Inflating air is then admitted through the passage 162 in the ram 44 to inflate the tire to the predetermined test inflation pressure. The drive motor 170 is then energized and the tire rotated at a preferred speed, in the present apparatus, 24 r.p.m. The carriage drive motor 346 is energized, in its high speed winding, to move the carriage 202 and the load roll 22 rapidly toward the tire to apply an initial load, e.g. about 100 pounds whereupon the motor 346 is switched to its low speed, moving the load roll 22 sufficiently to achieve the predetermined test load, in the present apparatus within the range of approximately 750 to 1,500 pounds. When the particular operation on the tire has been completed, in the present apparatus, the radial and lateral force variations and the eccentricity have been discovered, measured, and located, the carriage 202 and the load roll 22 are rapidly traversed away from the tire and the tire is demounted or dislodged first from the lower flange ring 80 and then from the upper flange ring 70 while the tire continues to rotate. Being dislodged from the respective flange rings, the tire is then lowered by downward movement of the ram 44 to deposit the tire again on the conveyor 410 for movement out of the apparatus.

It will have become apparent from the foregoing description that the invention provides significant advantages in the processing of tires. The apparatus enables the processing of tires in continuous succession without manual intervention and is particularly adapted to continuous conveyorized operation. In the particular operation of detecting, measuring, and locating anomalies in tires, the apparatus provides a particular advantage in its freedom from surface-to-surface friction in the elements comprising the detecting and measuring means so as to obtain accurate and reproducible measurements free from the errors attributable to surface-to-surface friction behavior.

The technique of prepositioning or prelocating a tire and then moving the tire from the prepositioning location into registry with the chucking means contribute significantly to the precise location of the tire with respect to its chucking so that the tire can readily be automatically chucked for true and coaxial rotation about the chucking axis. This technique reduces significantly the possibility of mismounting tires on the chucking means even in the absence of human attention.

Inasmuch as tires are commonly moved from operation to operation with their usual axes of rotation generally vertical, the apparatus provides the advantage of moving such tires directly into and out of the apparatus without necessity for additional manipulation or reorientation of the tire.

A particular advantage of the present apparatus lies in the fact that the load wheel and the carriage move so as to engage the tire with the roll generally in identical manner whatever be the outside diameter or width of the tires being operated upon and that no adjustment to the machine is required to accommodate different tires except for differences in bead diameter. In the latter event, it is necessary only to change the flange rings 70 and 80 to accommodate a different bead diameter. As a result, generally all tires having a bead diameter of say 15 inches can be operated upon in a continuing series without manual intervention regardless of their other dimensional differences.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for performing an operation on a cured tire comprising means for chucking said tire for rotation about a first axis coincident with the tire's axis of rotation in normal use, means for operating on said tire mounted for movement along a direction line in the radial plane of symmetry or equatorial plane of said tire and perpendicular to said axis, means for supporting the tire for movement along a path intersecting said axis including means for positioning said tire at a location spaced a predetermined fixed distance along said path from said first axis, means for moving the supporting means to move said tire along said path between said location and said first axis, and detecting means mounted on said apparatus to detect a tire traveling along said path, said detecting means being connected to communicate a signal in response to movement of a tire into operative relation with said means for positioning, said signal being effective to actuate the positioning means to position the tire at said location.

2. Apparatus as claimed in claim 1, in which said means for supporting a tire comprises conveyor means including a plurality of pairs of belt pulleys, a parallel pair of spaced apart belts looped respectively about said pulleys, said means for moving the supporting means including drive means connected to move said belts intermittently a distance sufficient at each movement to move a tire from said predetermined location along said path to coaxial registry with the first said axis.

3. Apparatus as claimed in claim 1, in which said means for supporting a tire includes a first conveyor having a plurality of endless belts adapted to receive a succession of tires from a supply thereof, means for driving said first conveyor including a first head shaft, a plurality of pulleys corotatably fixed on said first shaft and in driving engagement with said belts, second conveyor means comprising a second head shaft, a pair of spaced belt pulleys mounted corotatably upon said second head shaft, a pair of pulleys mounted on said first head shaft for rotation relative thereto, a parallel pair of spaced apart belts looped about the first and second head shafts and respectively about said pulleys mounted thereon, drive means including a motor having a brake connected to said second head shaft to drive said pair of belts a distance sufficient to advance a tire along said path from said location into coaxial registry with the said first axis and then to stop said pair of belts.

4. Apparatus as claimed in claim 1, said means for positioning said tire including means for centering said tire at the said location to place its axis of normal rotation into coincidence with a centering axis at least generally parallel to the first said axis.

5. Apparatus as claimed in claim 4, wherein said means for centering comprises means for moving said tire out of engagement with the supporting means and means mounted on the last said means for moving said tire radially of its own axis a distance sufficient to bring the tire and the centering axes into substantial coincidence.

6. Apparatus as claimed in claim 4, said means for centering a tire comprising a member movable between a first position for engagement with a sidewall of said tire and a second position spaced away from said tire, a plurality of fingers mounted swingably on said member to swing equally and outwardly of the centering axis at said location and spaced angularly thereabout, and means operable to swing said fingers and to move said member between said first and second positions.

7. Apparatus as claimed in claim 1, in which said means for chucking includes first means mounted for rotation coaxially of the first said axis and having means engageable with a wheel center engaging portion of said tire to locate said portion at a predetermined fixed distance relation with and above said direction line, and second means mounted for rotation coaxially of the first said axis and having means engageable with another wheel center engaging portion of said tire and movable coaxially of the first said axis between a first position wherein the tire engageable means of said second means is in predetermined fixed distance relation to and below said direction line a distance substantially equal to the first said relation and above said means for supporting the tire and a second position wherein the tire engaging means of said second means is disposed below said means for supporting the tire, and means for effecting relative axial movement of the tire engageable means of said second means, between the said first and said second position thereof.

8. Apparatus as claimed in claim 7, further including means for latching said first and said second means to prevent separating movement therebetween while the same are in their respective said spaced relation with respect to said direction line.

9. Apparatus as claimed in claim 7, further comprising a pilot having a generally cylindrical inner surface coaxial with the first said axis and fixed rigidly corotatably on said first means, a second pilot having a generally cylindrical outer surface generally coaxial with the first said axis and fixed rigidly corotatably to said second means, the surfaces of the respective pilots being engageable telescopically to effect a positive coaxial relation between the first and the second said tire engaging means.

10. An apparatus for performing an operation on a cured inflatable tire including means for chucking and inflating said tire for rotation about an axis coincident with the rotation axis of the tire in its intended use, the improvement comprising means for supporting and conveying said tire along a path intersecting said axis, said means for chucking including means engageable with said tire and movable transversely through said path to engage a tire in said path and move the tire from the path into chucking relation with said means for chucking, said means for supporting said tire including means for positioning said tire at a location spaced a predetermined distance along said path from said axis, and means for moving the supporting means to move the tire along said path between said location and said first axis, said means for positioning a tire comprising a member movable between a first position for engagement with the sidewall of said tire and a second position spaced away from said tire, a plurality of fingers mounted swingably on said member to swing equally and outwardly of the centering axis at said location and spaced angularly thereabout, and means operable to swing said fingers and to move said member between said first and said second positions.

* * * * *